(12) United States Patent
Landau

(10) Patent No.: US 9,587,972 B2
(45) Date of Patent: Mar. 7, 2017

(54) MULTI PORTION CONTROLLED DRY FOOD DISPENSER

(71) Applicant: Ofer Landau, Eyn Vered (IL)

(72) Inventor: Ofer Landau, Eyn Vered (IL)

( * ) Notice: Subject to any disclaimer, the term of this patent is extended or adjusted under 35 U.S.C. 154(b) by 0 days.

(21) Appl. No.: 14/636,199

(22) Filed: Mar. 3, 2015

(65) Prior Publication Data

US 2015/0253172 A1 Sep. 10, 2015

Related U.S. Application Data

(60) Provisional application No. 61/948,036, filed on Mar. 5, 2015.

(51) Int. Cl.
| | | |
|---|---|---|
| *G01F 11/24* | (2006.01) | |
| *B01F 7/00* | (2006.01) | |
| *B01F 7/16* | (2006.01) | |
| *B01F 15/00* | (2006.01) | |
| *B01F 3/18* | (2006.01) | |
| *B01F 3/00* | (2006.01) | |

(52) U.S. Cl.
CPC .............. *G01F 11/24* (2013.01); *B01F 3/18* (2013.01); *B01F 7/00291* (2013.01); *B01F 7/165* (2013.01); *B01F 15/00506* (2013.01); *B01F 2003/0028* (2013.01)

(58) Field of Classification Search
CPC .............. A47J 31/404; B01F 15/00506; B01F 2003/0028; B01F 3/18; B01F 7/00291; B01F 7/165; B29C 31/06; G01F 11/24
See application file for complete search history.

(56) References Cited

U.S. PATENT DOCUMENTS

| | | | | | |
|---|---|---|---|---|---|
| 2,584,781 | A | * | 2/1952 | Beatty ................... | G01F 11/24 222/181.2 |
| 4,032,050 | A | * | 6/1977 | Funk ...................... | G01F 11/24 222/284 |
| 4,174,058 | A | * | 11/1979 | Bassignani ............ | G01F 11/24 222/438 |
| 4,322,017 | A | * | 3/1982 | Lowdermilk ........... | G01F 11/24 222/217 |
| 5,934,516 | A | * | 8/1999 | Strycharske ............ | A23G 3/28 222/158 |

(Continued)

*Primary Examiner* — Frederick C Nicolas
*Assistant Examiner* — Bob Zadeh
(74) *Attorney, Agent, or Firm* — Edward Langer; Adv & Patent Attorney

(57) ABSTRACT

There is provided a dry food dispensing apparatus for connecting to a storage receptacle, for the purpose of controlling the portion size and accuracy of the dispensed food, the apparatus having a base providing a housing defining a hollow circumferential interior with a centrally disposed hub, an extraction element disposed in the housing for extracting a first pre-determined portion of the dry food, a rotatable cell holder having a centrally disposed socket for engaging the hub of the base from above, having at least one open-bottomed cell for receiving and temporarily storing the extracted first pre-determined portion; and a dispensing aperture formed in a bottom of the base for releasing the first temporarily stored portion when the extraction element is operated to extract a second pre-determined portion, and the extraction element is operated in a cyclical fashion to obtain from the extracted portions a desired quantity of the dry food.

19 Claims, 10 Drawing Sheets

(56) References Cited

U.S. PATENT DOCUMENTS

| | | |
|---|---|---|
| 7,731,063 B2 | 6/2010 | Rusch |
| 8,181,827 B2 * | 5/2012 | Long et al. ............ G01F 11/24 222/189.02 |
| 2015/0253172 A1 * | 9/2015 | Landau ................. G01F 11/24 222/1 |

* cited by examiner

MULTI PORTION CONTROLLED DRY FOOD DISPENSER

FIELD OF THE INVENTION

The present invention relates generally to bulk dispensing systems for dry foods, and more particularly to a system for dispensing pre-determined quantities of dry foods.

BACKGROUND OF THE INVENTION

Dry food dispensers are widely used for various types of food and in many establishments. Dispensers are popularly used for breakfast cereals in hotels, but not limited to them only.

One of the most widely used sports supplements by far is protein powder. Protein powders are available in gyms, health food stores and the like. These powders are generally stored in bottles or large tubs, and the portions are extracted and measured by a scooper of a known size or volume. The use of a scooper depends on hand manipulation, and is therefore messy, creates waste of product and is unsanitary.

Dispensers are gaining popularity in the field of toppings in ice cream and yogurt shops as well, and by so, maintaining the freshness and cleanliness of the toppings, instead of them being poured into bowls and being exposed to possible contaminates.

In some cases it is essential that dry food be accurately measured, for instance, in the case of protein powder, as part of a nutritional and work-out program for athletes.

SUMMARY OF THE INVENTION

Accordingly, it is a principal object of the present invention to overcome the limitations of prior art dispensers.

The inventive dry food dispenser is designed to dispense food, stored in a storage receptacle, in portions in accordance with pre-determined quantities dependent upon the operation of the dispensing apparatus.

In accordance with a preferred embodiment of the present invention, there is provided a dry food dispensing apparatus for connecting to a storage receptacle, for the purpose of controlling the portion size of the dispensed food, said apparatus comprising:

a base comprising a housing defining a hollow circumferential interior with a centrally disposed hub;

an extraction means disposed in said housing for extracting a first pre-determined portion of the dry food;

a rotatable cell holder comprising a centrally disposed socket for engaging said hub of said base from above, having at least one open-bottomed cell for receiving and temporarily storing said extracted first pre-determined portion; and a dispensing aperture formed in a bottom of said base for releasing said first temporarily stored portion when said extraction means is operated to extract a second pre-determined portion, wherein said extraction means is operated in a cyclical fashion to obtain from said extracted portions a desired quantity of the dry food.

According to a preferred embodiment, the inventive multi-portioned control dispenser provides dispensing of an accurate pre-determined portion, while maintaining freshness of the food stored in a receptacle. The inventive dispenser further avoids messiness, waste and contamination of the food.

Further according to a preferred embodiment of the present invention, the extraction means is provided with a static cell cover which is used for the dispensing of granular dry food and is provided with two levels, a bottom level and a top level.

According to a second preferred embodiment of the present invention, the extraction means is provided with a static cell cover which is used for the dispensing of powdered food and is provided with a single level.

According to a third preferred embodiment of the present invention, the single level cell cover and the two-leveled cell cover include a screw thread for directly connecting a bottle of dry food to the dispensing apparatus.

Additional features and advantages will become apparent from the following drawings and description.

BRIEF DESCRIPTION OF THE DRAWINGS

For a better understanding of the invention with regard to the embodiments thereof, reference is made to the accompanying drawings, in which like numerals designate corresponding elements or sections throughout, and in which.

DETAILED DESCRIPTION OF THE PREFERRED EMBODIMENTS

It is a principal object of the present invention to provide a system for dispensing pre-determined multi-portioned quantities of dry foods, granulated or powdered.

Figure 1:
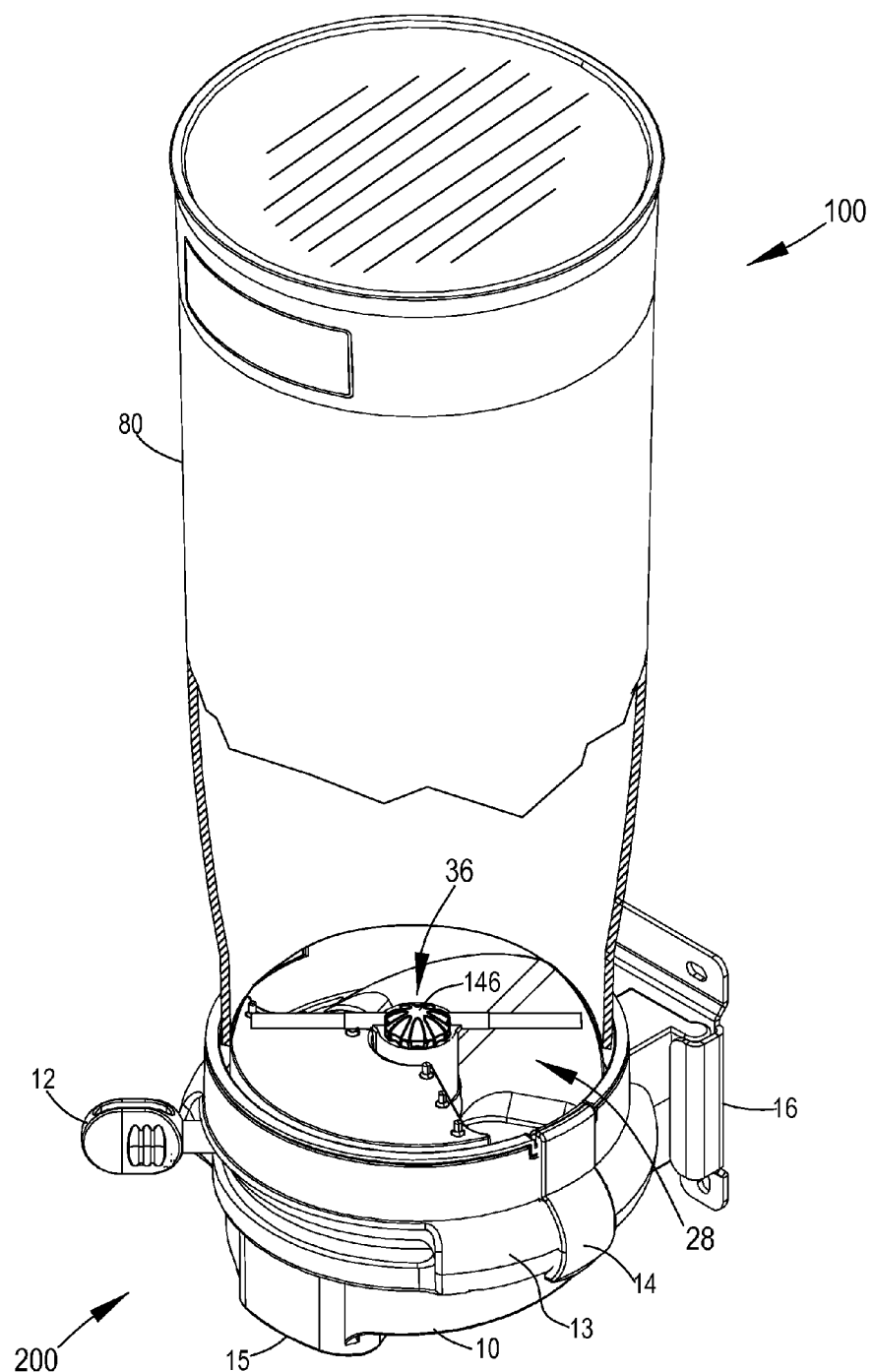
FIG. 1 shows the multi portion control dispenser of the present invention, attached to a storage receptacle.

Referring now to FIG. 1, there is shown multi-portioned control food dispenser 100, having dispensing apparatus 200, comprising extraction means and releasing means, connected to the bottom of food storage receptacle 80. Dispensing apparatus 200 comprises a base 10 which has a slidable handle 12, moved sideways for dispensing each portion. Clip 14 connects base 10 to receptacle 80 and locks it into its position. A cutaway view of receptacle 80 is shown, for revealing cell cover 28, mixer 36 and nut 146.

Wall mounting bracket 16 is positioned at the back side of base 10, for the option of mounting the food dispenser 100 on a wall.

As will be further described herein, dry food dispenser 100 is designed to dispense food, stored in storage receptacle 80, in portions in accordance with pre-determined quantities dependent upon the operation of dispensing apparatus 200.

Figure 2:
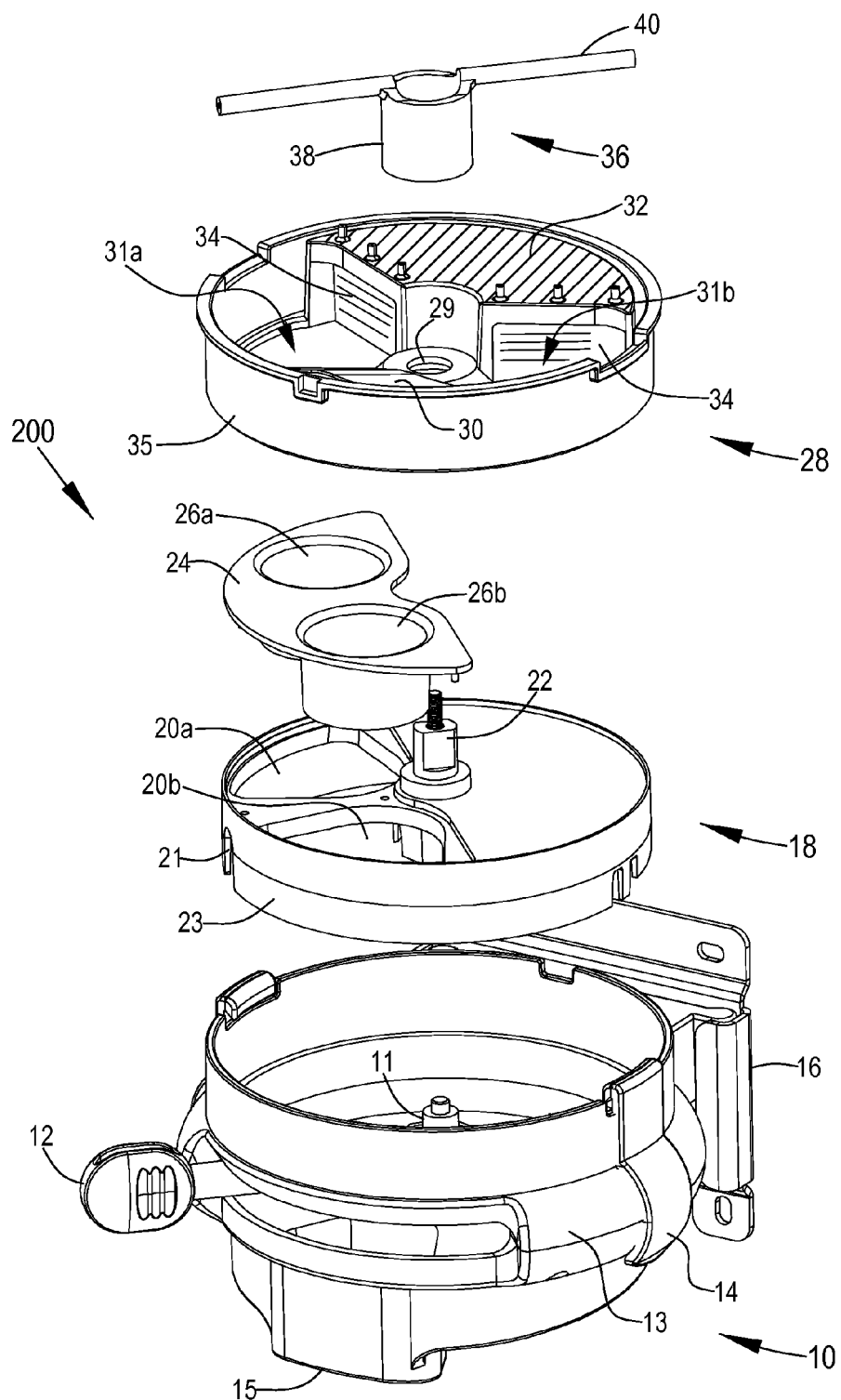
FIG. 2 shows an exploded view of the dispenser of FIG. 1.

Referring now to FIG. 2, there is shown a perspective exploded view of dispensing apparatus 200, showing base 10, cell holder 18, cassette 24, cell cover 28 and mixer 36.

Cylindrical base 10 has a hollow circumferential interior with a centrally disposed hub 11, and has a slidable handle 12 extending from hub 11 through and externally to wall 13 of base 10. The volume of the interior is defined by wall 13 and floor 17 (see FIG. 3A), with a dispensing aperture 15 formed in floor 17 on the bottom of base 10. As described further in FIGS. 3A-B, aperture 15 provides an exit of dry food dispensed from dispenser 100.

Base 10 further has connecting clips 14 disposed on both sides, and wall mounting bracket 16 for the option of mounting dispenser 100 on a wall.

Rotatable cell holder 18 is ring-shaped and is adapted to be seated within the hollow interior of base 10, and has a centrally disposed socket 22 for engaging hub 11 from above. Cell holder 18 has two cell apertures 20a-b formed therein for insertion of open-bottomed cells 26a-b of cassette 24. Cassette 24 may vary in the sizes of cells 26, ranging from approx. 5 cc per cell to approx. 35 cc. Wall 23 of cell holder 18 has slot 21 formed therein to accommodate handle 12 from within base 10, so that when handle 12 is slid from side to side, hub 11 rotates and cell holder 18 is rotated along with it.

Double-leveled cell cover 28 is placed over cell holder 18 and is used as a partition between the dry food in storage receptacle 80 above it and dispensing apparatus 200. Cell cover 28 is static and is seated over rotatable cell holder 18 via a centrally-disposed hole 29 accommodating socket 22 of cell holder 18. The partition of cell cover 28 is provided by the bottom level 30 which is formed with two cell openings 31a-b (see FIG. 5A). These openings 31a-b, enable dry food to fall through them and into cells 26a-b. Bottom level 30 is formed as a slanted surface with cell openings 31a-b positioned across from each other. The slanted surface of bottom level 30 directs the dry food into cells 26a-b. Top-level section 32 of cell cover 28 has two semi-rigid wipers 34 disposed vertically to bottom level 30. Lower edges of wipers 34 provide a wiping function for the purpose of assuring portion accuracy by wiping any excess dry food accumulated over cells 26a-b. Wipers 34 are semi-rigid and adapted to be flexible enough so as to avoid breaking hard granular food such as nuts, and rigid enough so as to avoid having the hard food jam the movement of cell holder 18. Cell cover 28 has a rim 35 which surrounds wall 23 of cell holder 18 when seated upon it, for preventing the food from spilling out of cell holder 18.

Seated over cell cover 28 is mixer 36 which connects to socket 22 via stem 38 inserted through hole 29. Wings 40 extend from stem 38, and they rotate with handle 12 sliding movement, thereby mixing the dry food in storage receptacle 80 for the purpose of avoiding agglomeration.

Figure 3A:
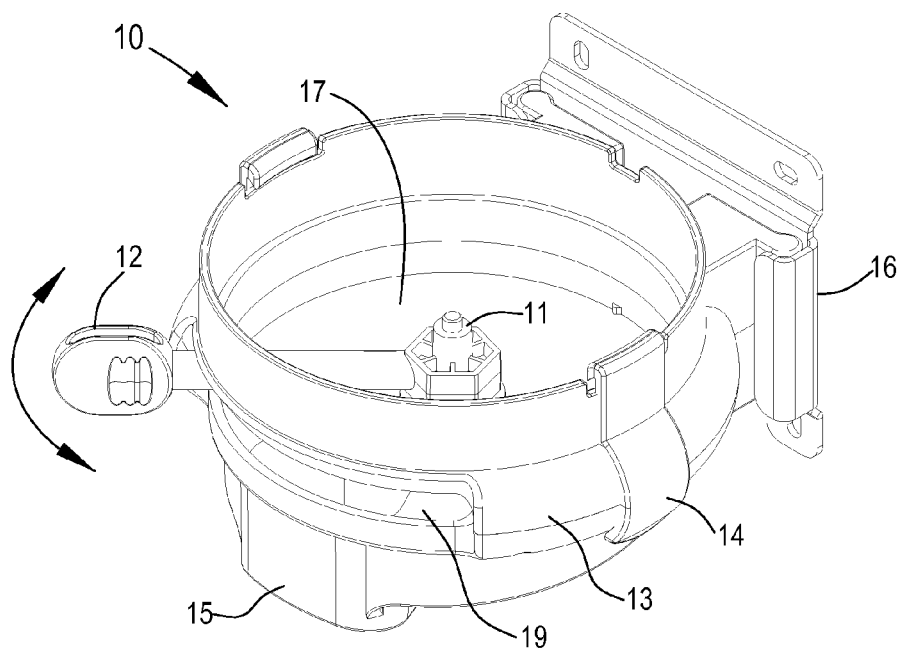
FIGS. 3A-B show a perspective and top view of the base of the dispenser.
Figure 3B:
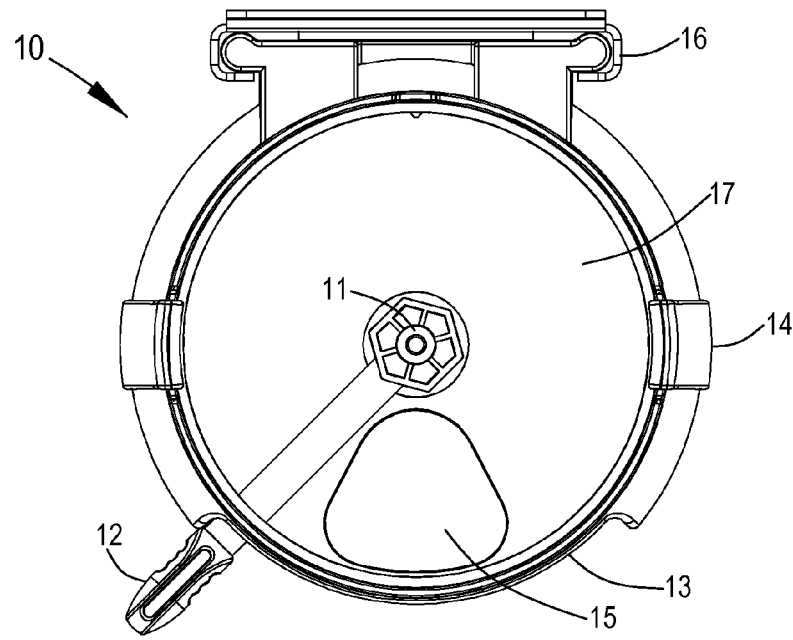

Referring now to FIG. 3A-B, there is shown cylindrical base 10 having a hollow circumferential interior with a centrally disposed hub 11 having a slidable handle 12 extending therefrom and protruding through a window 19 formed in wall 13 of base 10. Base 10 further has connecting clips 14 disposed on both sides, and wall mounting bracket 16 for the option of mounting dispenser 100 on a wall. The hollow interior is formed with dispensing aperture 15, as shown in FIG. 3B, on the bottom of base 10 for the exit of the dry food from dispenser 100. Cell holder 18 is seated in the hollow circumferential interior, as described in FIG. 4 herein below.

Figure 4:
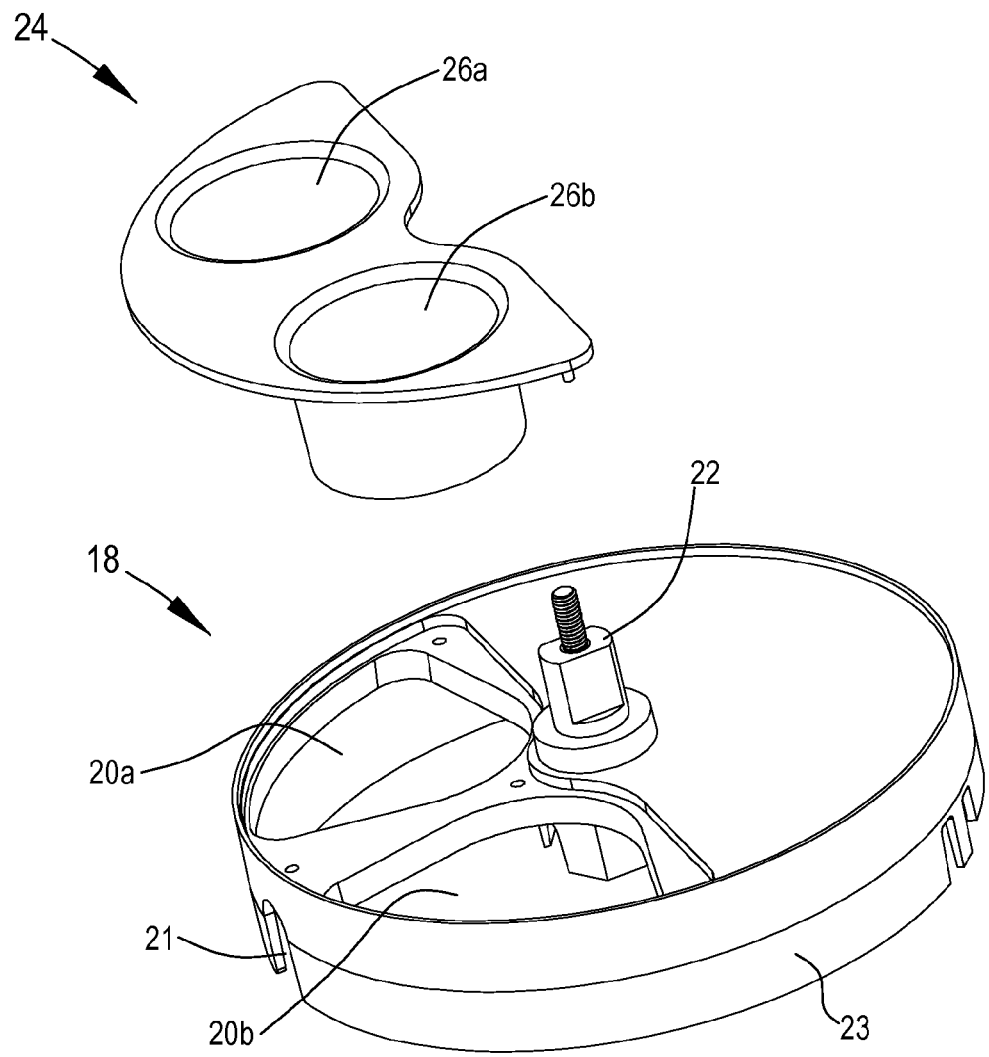
FIG. 4 shows the cell holder and cassette of the dispenser.

Referring now to FIG. 4, there is shown cell holder 18 having cell apertures 20a-b formed therein, for the insertion of open-bottomed cells 26a-b of cassette 24. Cassette 24 may vary the size of cells 26a-b each defining a pre-determined volume capacity. Cassette 24 is interchangeable with any other cassette having different cell sizes, according to the need and the specific dry food to be dispensed from dispenser 100.

Cassette 24 may be made of polypropylene or any other suitable material.

Figure 5A:
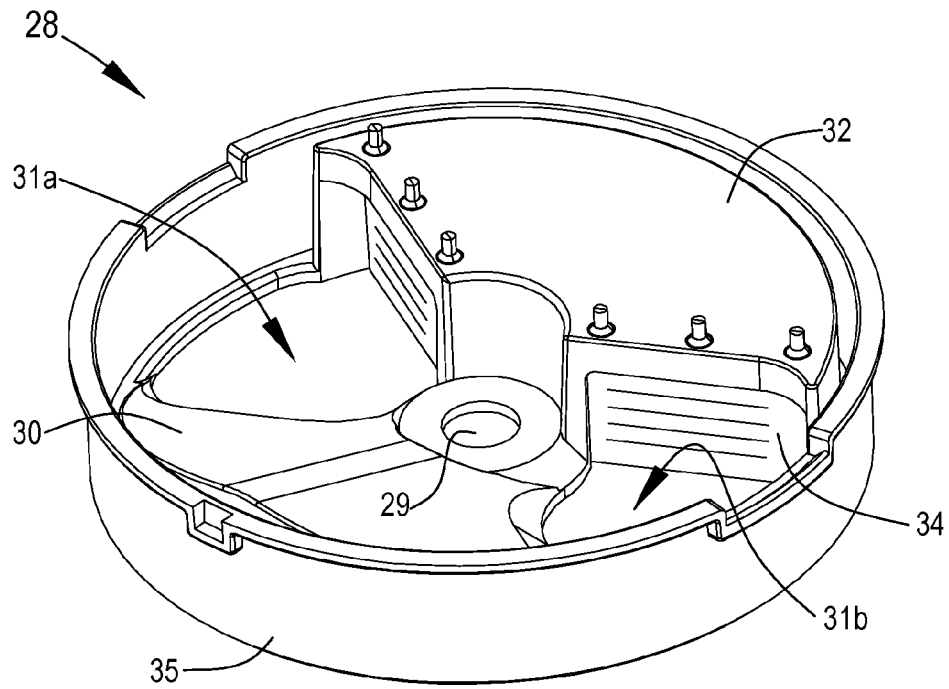
FIG. 5A shows the cell cover, for granulated foods, of the dispenser.

Referring now to FIG. 5A, there is shown cell cover 28, unattached to the other parts of dispenser 100. Cell cover 28 is double-leveled and is used as a partition between the dry food in storage receptacle 80 above it and dispensing apparatus 200. Cell cover 28 is static and is seated over rotatable cell holder 18 via a centrally-disposed hole 29 accommodating socket 22 of cell holder 18 (see FIG. 4). Cell cover 28 is provided by the bottom level 30 which is formed with two cell openings 31a-b. These cell openings 31a-b, enable dry food to fall through them and into cells 26a-b, when they are aligned. Bottom level 30 is formed as a slanted surface to direct the dry food into cells 26a-b. Top-level section 32 of cell cover 28 has two semi-rigid wipers 34 disposed vertically to bottom level 30. Lower edges of wipers 34 provide a wiping function for the purpose of assuring portion accuracy by wiping any excess dry food accumulated over cells 26a-b. Wipers 34 are semi-rigid and adapted to be flexible enough so as to avoid breaking hard granular food such as nuts, and rigid enough so as to avoid having the hard food jam the movement of cell holder 18. Cell cover 28 has a rim 35 which surrounds wall 23 of cell holder 18 (see FIG. 4) when seated upon it, for preventing the food from spilling out of cell holder 18.

Figure 5B:
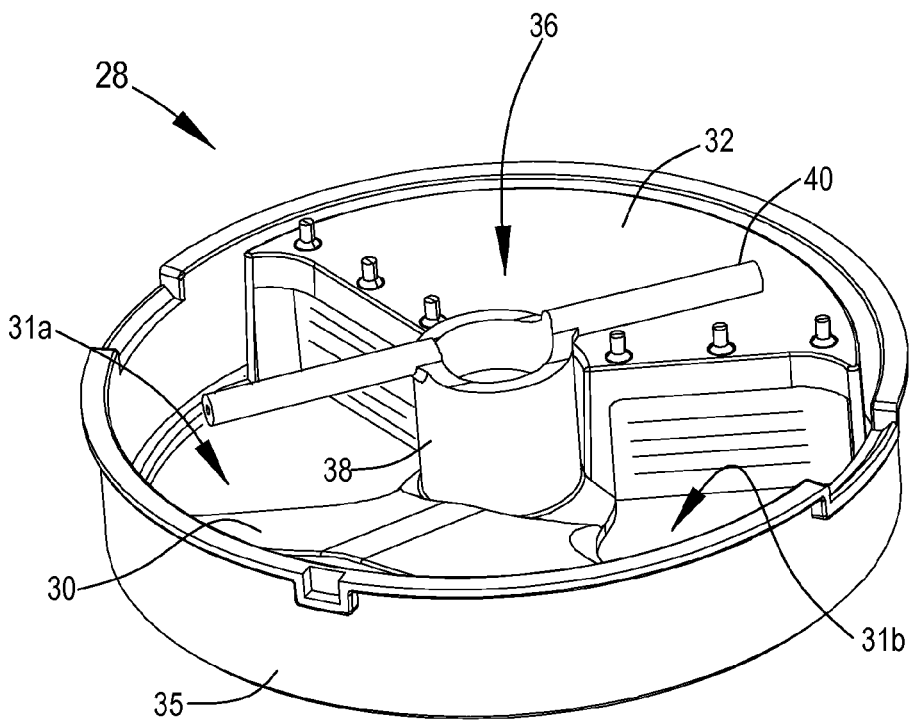
FIG. 5B shows the cell cover of FIG. 5A connected to a mixer.

Referring now to FIG. 5B, there is shown cell cover 28 with mixer 36 seated over it. Mixer 36 connects to socket 22 via stem 38, inserted through hole 29 (see FIG. 4). Wings 40 extend from stem 38, and they rotate with handle 12 sliding movement, thereby mixing the dry food in storage receptacle 80 for the purpose of avoiding agglomeration.

Figure 6A:
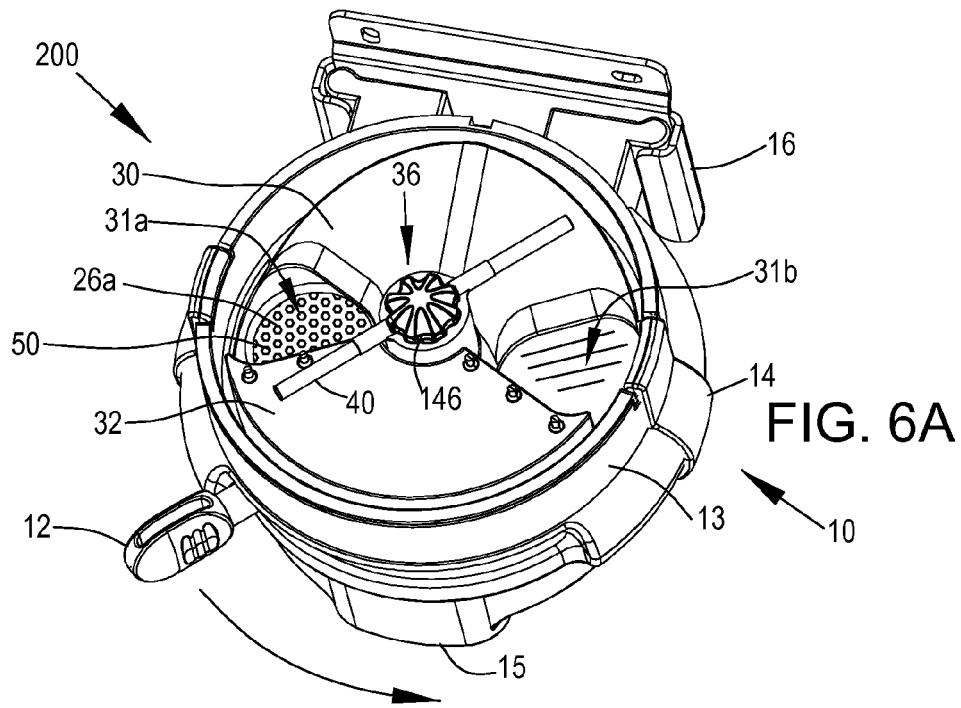
FIGS. 6A-B show the dispenser in operation.
Figure 6B:
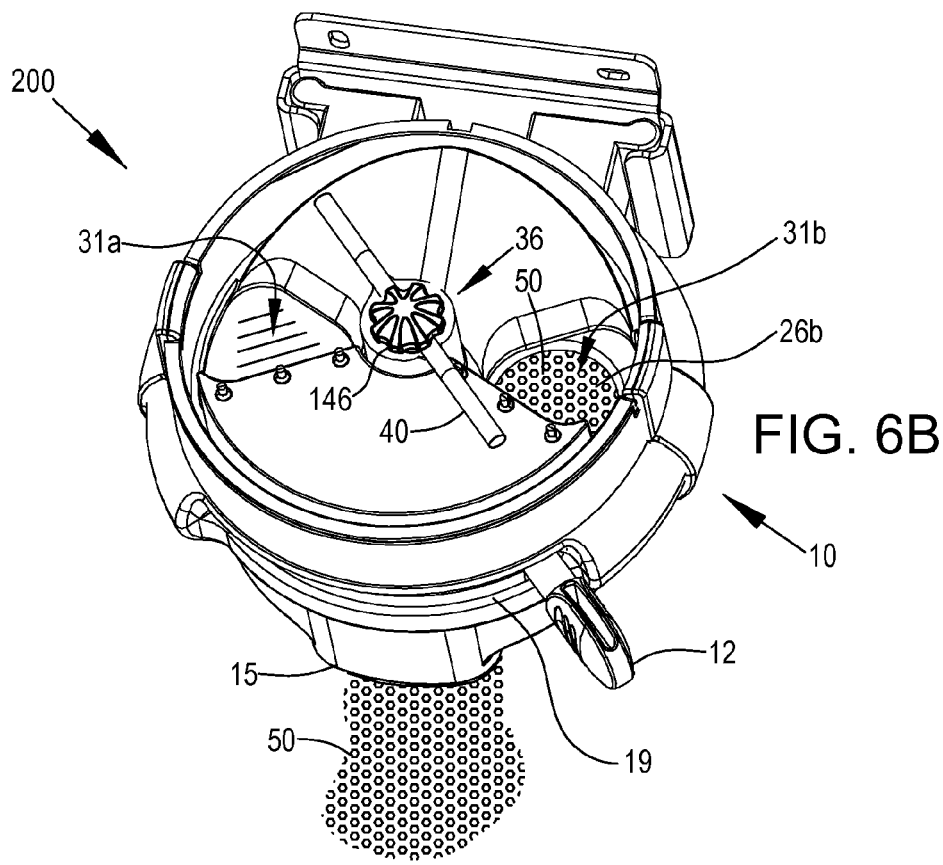

Referring now to FIGS. 6A-B, there is shown the dispenser apparatus 200 in use. The components of dispenser apparatus 200 are assembled and storage receptacle 80 is seated over base 10 and filled with dry food 50. Wall 23 has a slot 21 formed therein, for accommodating handle 12 of base 10.

Use of dispenser 100 for dispensing portions of dry food 50, involves a cyclical operation of extraction and release performed in a repeatable fashion.

As shown in FIG. 6A, cell 26a is aligned with opening 31a and is filled with the dry food 50 spilling from storage receptacle 80 above (not shown), while floor 17 (not shown) of base 10 provides a bottom for open-bottomed cell 26a so that the food 50 stays in the cell 26.

When handle 12 is slid from one side to the other in a first direction, hub 11 rotates and cell holder 18 is rotated along with it (see FIGS. 2 and 3A). The rotation of cell holder 18 thereby rotates cassette 24, until cell 26a is aligned with dispensing aperture 15 so that the dry food 50 is released and drops from open-bottomed cell 26a through dispensing aperture 15 and exits dispenser 100.

Thus as a result of the motion of handle 12 shown in FIG. 6A, cell 26b is aligned with opening 31b, as shown in FIG. 6B. At this point cell 26b is aligned with opening 31b and is filled with dry food 50. For dispensing the portion of food 50 in cell 26b, handle 12 is slid back to the other direction. This cyclical dispensing operation is repeated multiple times until storage receptacle 80 is empty, and then it may be refilled.

With every movement of handle 12, mixer 36 is rotated along, so that wings 40 mix the contained dry food 50 for the purpose of avoiding agglomeration.

Figure 7A:
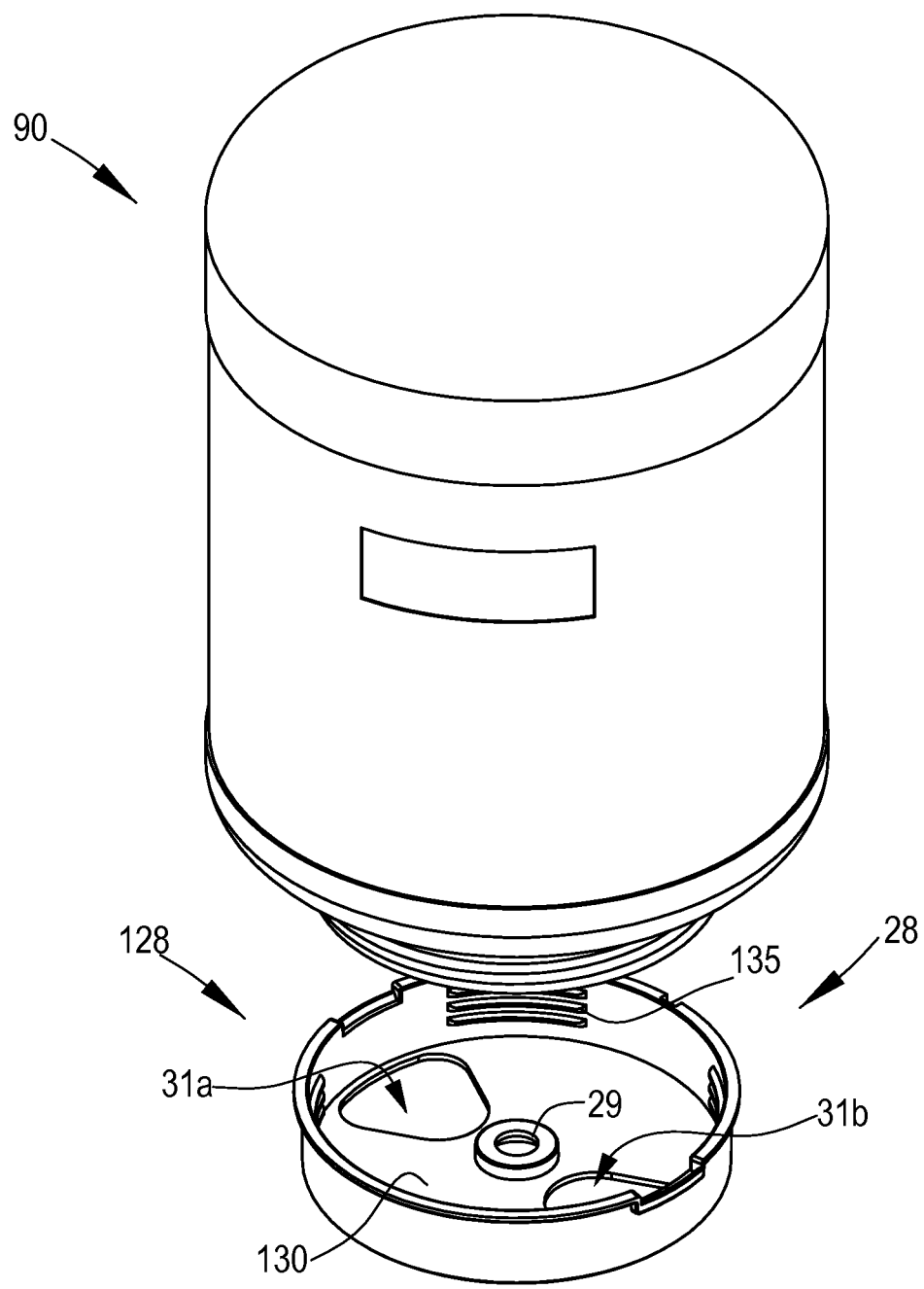
FIGS. 7A-B show a cell cover having a threaded screw for directly screwing onto a bottle.
Figure 7B:
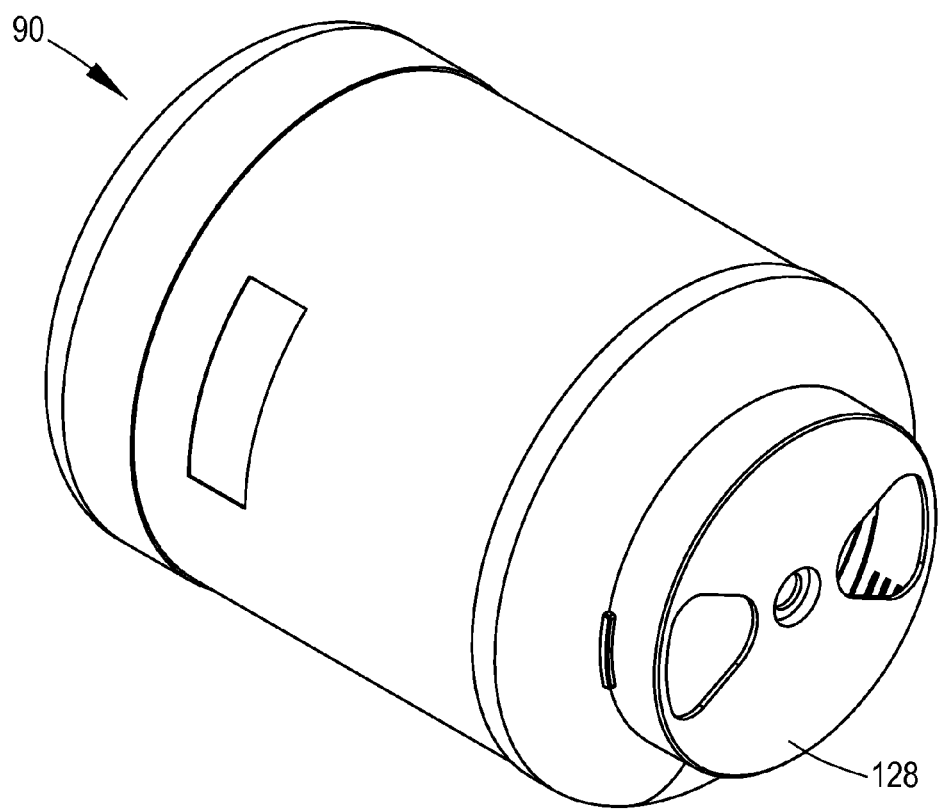

Referring now to FIGS. 7A-B, there is shown cell cover 128, adapted for use with powdered foods, unlike granular foods. Cell cover 128 has a single level, which is flat surface 130, with hole 29 disposed in the center for accommodating socket 22 of cell holder 18 (not shown here).

A feature for easily and directly attaching cell cover 128 to a commercially sold bottle 90 of powdered food is screw threads 135. Screw threads 135 allow for a manufacturer's bottle 90 of powdered food, such as protein powder, to be directly attached to dispensing apparatus 200, rather than transferring the contents of bottle 90 into storage receptacle 80, thereby avoiding possible spillage and contamination of the powder.

Figure 8:
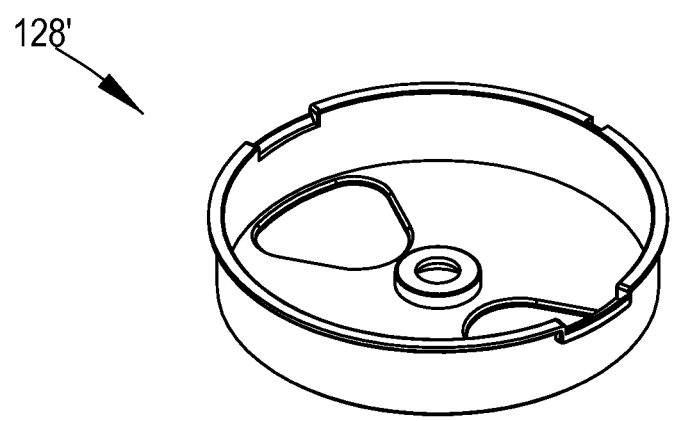
FIG. 8 shows a cell cover for powders.

Referring now to FIG. 8, there is shown cell cover 128', which is similar to cell cover 128 but without screw threads 135, for the attachment of storage receptacle 80.

Figure 9:
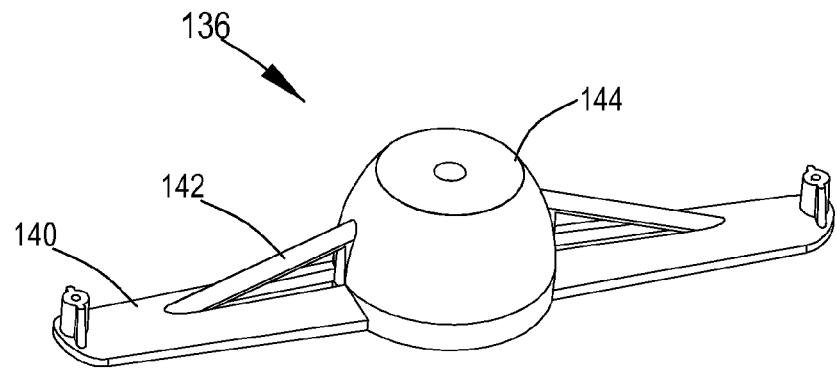
FIG. 9 shows a mixer for powders.
Figure 10:
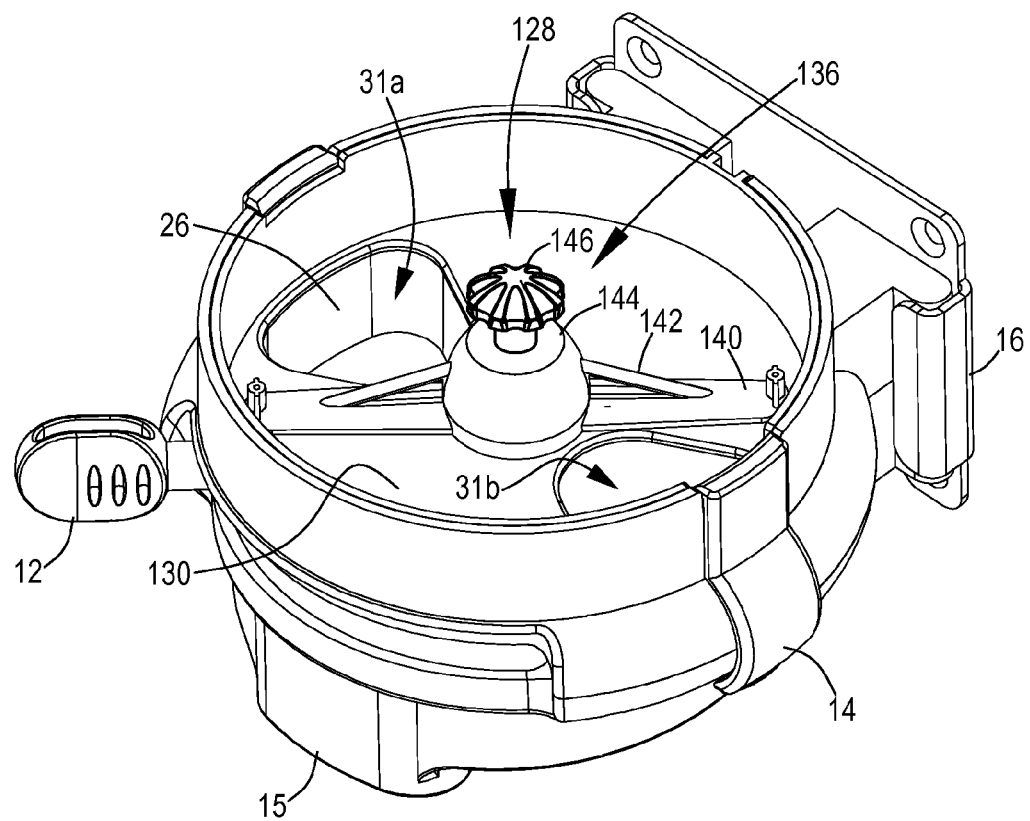
FIG. 10 shows the mixer of FIG. 8 mounted onto the cell cover of FIG. 7 seated in the base.

Referring now to FIGS. 9-10, there is shown mixer 136 which connects to cell cover 128 or 128', having a hub cover 144 connecting over hub 11, and flat-bottomed wings 140 disposed on two sides of the bottom of hub cover 144 which wipe surface 130, by being situated closely to it. Mixer 136 rotates as handle 12 is slid from side to side, thereby having wings 140 wiping dry food from surface 130 and into cell 26. Support rods 142 of mixer 136 are for the purpose of mixing the powdered food to avoid agglomeration, and for strengthening the support of flat-bottomed wings 140 connected to the hub cover 144. Nut 146 is connected over hub cover 144, for locking all the parts together, so they will not become separated.

Although particular embodiments of the invention have been described and illustrated herein, it is recognized that modifications and variations may readily occur to those skilled in the art and consequently, it is intended that the claims be interpreted to cover such modifications and equivalents.

I claim:

1. A dry food dispensing apparatus for connecting to a storage receptacle, for the purpose of controlling a portion size of the dry food being dispensed, said apparatus comprising:
   a base comprising a housing defining a hollow circumferential interior having a centrally disposed hub;
   an extraction means disposed in said housing for extracting a first pre-determined portion of the dry food, said extraction means comprising:
   a rotatable cell holder comprising a centrally disposed socket for engaging said hub of said base from above, having a pair of open-bottomed cells, wherein one open-bottomed cell of said pair of open-bottomed cells is for receiving and temporarily storing said extracted first pre-determined portion, wherein each open-bottomed cell is associated with a corresponding cell aperture formed in said cell holder for insertion of a cassette having said pair of open-bottomed cells; and
   a dispensing aperture formed in a bottom of said base for releasing said temporarily stored extracted first pre-determined portion when said extraction means is operated to extract a second pre-determined portion,
   wherein said extraction means is operated in a cyclical fashion to obtain from said first and second pre-determined extracted portions a desired quantity of the dry food.

2. The dry food dispensing apparatus of claim 1, wherein said extraction means comprises:
   a static cell cover seated over said rotatable cell holder via a centrally disposed hole accommodating said socket of said cell holder;
   wherein said static cell cover comprises at least one opening for enabling said first and second pre-determined portions of the dry food from the storage receptacle to drop therethrough and into said pair of open-bottomed cells of said rotatable cell holder, thereby extracting said first and second pre-determined portions of the dry food from the storage receptacle.

3. The dry food dispensing apparatus of claim 2, wherein said static cell cover comprises a bottom level and a top level, wherein said top level comprises two semi rigid wipers disposed vertically to said bottom level, and wherein said wipers wipe any excess the dry food accumulated over said cells as said cell holder is rotated, thereby providing portion accuracy.

4. The dry food dispensing apparatus of claim 3, wherein said semi rigid wipers are made of a material flexible enough so as to avoid breaking hard granular food and also hard enough to avoid jamming the movement of said cell holder.

5. The dry food dispensing apparatus of claim 2, wherein said cell cover comprises a mixer seated over said cell cover, wherein said mixer comprises:
   a stem inserted through said centrally disposed hole of said cell cover;
   at least two wings extending from said stem;
   wherein said mixer rotates with said sliding of said slidable handle, thereby mixing the dry food in the storage receptacle for the purpose of avoiding agglomeration of the dry food.

6. The dry food dispensing apparatus of claim 1, wherein said cells of said cassette are of a predetermined volume and vary between approximately 5 cc to 35 cc, and said cassette is changeable according to a desired portion volume.

7. The dry food dispensing apparatus of claim 1, wherein said base comprises a vertical wall through which a slidable handle extends from said hub, and wherein said handle is situated within a slot formed in a wall of said cell holder, so that when said handle slides from side to side, said cell holder is thereby rotated so that said first and second pre-determined portions of dry food are extracted from the storage receptacle and into said cells.

8. The dry food dispensing apparatus of claim 1, wherein said cassette of said rotatable cell holder releases said first pre-determined portion of the dry food from one of said pair of open-bottomed cells into said dispensing aperture, by rotating said cell holder in a first direction, and wherein when said cell holder is rotated opposite to said first direction, said second pre-determined portion of the dry food is released from a second cell of said pair of open-bottomed cells.

9. The dry food dispensing apparatus of claim 1, wherein said base comprises a floor, wherein said floor provides a bottom for said open-bottomed cells for temporarily storing said extracted first pre-determined portion.

10. The dry food dispensing apparatus of claim 1, wherein said base further comprises connecting clips disposed on both sides for connecting said base to a food receptacle.

11. The dry food dispensing apparatus of claim 1, wherein said base further comprising a wall mounting bracket for an option of mounting the dry food dispensing apparatus on a wall.

12. The dry food dispensing apparatus of claim 1, wherein said cassette is made of polypropylene or any other suitable material.

13. The dry food dispensing apparatus of claim 1, wherein said cell cover comprises screw threads for directly attaching said cell cover to a commercially sold bottle of the dry food.

14. The dry food dispensing apparatus of claim 1, wherein said cell cover comprises a single level with a flat surface, thereby being adapted for use with powdered food.

15. A dry food dispensing apparatus for the purpose of controlling a portion size of the dry food being dispensed, said apparatus comprising:
 a storage receptacle for containing the dry food,
 a base comprising a housing defining a hollow circumferential interior with a centrally disposed hub, wherein said storage receptacle is seated over said base;
 an extraction means disposed in said housing for extracting a first pre-determined portion of the dry food, said extraction means comprising;
 a rotatable cell holder comprising a centrally disposed socket for engaging said hub of said base from above, having a pair of open-bottomed cells, wherein one open-bottomed cell of said pair of open-bottomed cells is for receiving and temporarily storing said extracted first pre-determined portion wherein each open-bottomed cell is associated with a corresponding cell aperture formed in said cell holder for insertion of a cassette having said pair of open-bottomed cells, and wherein said rotatable cell holder further comprises a wall having a slot formed therewithin, wherein said slot accommodates a slidable handle extending from said hub of said base through a vertical wall of said base, so that when said handle slides from side to side, said cell holder is thereby rotated so that said first pre-determined portion of the dry food is extracted from said storage receptacle and into said cells; and
 a dispensing aperture formed in a bottom of said base for releasing said first temporarily stored portion when said extraction means is operated to extract a second pre-determined portion,
 wherein said extraction means is operated in a cyclical fashion to obtain from said extracted first and second pre-determined portions a desired quantity of the dry food.

16. The dry food dispensing apparatus of claim 15, wherein said extraction means comprises:
 a static cell cover seated over said rotatable cell holder via a centrally disposed hole accommodating said socket of said cell holder;
 wherein said static cell cover comprises at least one opening for enabling the dry food from the storage receptacle to drop therethrough and into said at least one cell of said rotatable cell holder, thereby extracting said first and second predetermined portion of the dry food from the storage receptacle.

17. The dry food dispensing apparatus of claim 15, wherein said cells of said cassette are of a predetermined volume and vary between approximately 5 cc to 35 cc, and said cassette is changeable according to the desired portion volume.

18. A dry food dispensing apparatus for connecting to a storage receptacle, for the purpose of controlling a portion size of the dry food being dispensed, said apparatus comprising:
 a base comprising a housing defining a hollow circumferential interior having a centrally disposed hub;
 an extraction means disposed in said housing for extracting a first pre-determined portion of the dry food, said extraction means comprising:
 a rotatable cell holder comprising a centrally disposed socket for engaging said hub of said base from above, having a pair of open-bottomed cells, wherein one open-bottomed cell of said pair of open-bottomed cells is for receiving and temporarily storing said extracted first pre-determined portion, wherein each open-bottomed cell is associated with a corresponding cell aperture formed in said cell holder for insertion of a cassette having said pair of open-bottomed cells, wherein said extraction means comprises a static cell cover seated over said rotatable cell holder via a centrally disposed hole accommodating said socket of said cell holder,
 wherein said static cell cover comprises at least one opening for enabling the dry food from the storage receptacle to drop therethrough and into said pair of open-bottomed cells of said rotatable cell holder, thereby extracting said predetermined portion of dry food from the storage receptacle, and said static cell cover further comprises a bottom level and a top level, wherein said top level comprises two semi rigid wipers disposed vertically to said bottom level, and wherein said wipers wipe any excess of the dry food accumulated over said cells as said cell holder is rotated, thereby providing portion accuracy;
 and
 a dispensing aperture formed in a bottom of said base for releasing said first temporarily stored portion when said extraction means is operated to extract a second pre-determined portion,
 wherein said extraction means is operated in a cyclical fashion to obtain from said extracted first and second pre-determined portions a desired quantity of the dry food.

19. A method for dispensing a pre-determined and accurate portion of dry food, said method comprising:
 extracting a first pre-determined portion of the dry food,
 wherein said extracting is done via extracting means comprising a rotatable cell holder comprising a centrally disposed socket, having a pair of open-bottomed cells, wherein one open-bottomed cell of said pair of open-bottomed cells is for receiving and temporarily storing said extracted first pre-determined portion, wherein each said open-bottomed cell is associated with a corresponding cell aperture formed in said cell holder for insertion of a cassette having said pair of open-bottomed cells;
 wherein said extraction means comprises a static cell cover seated over said rotatable cell holder via a centrally disposed hole accommodating said socket of said cell holder,
 wherein said static cell cover comprises at least one opening for enabling the dry food to drop therethrough and into said pair of open-bottomed cells of said rotatable cell holder, thereby extracting said predetermined portion of the dry food from the storage receptacle;
 receiving and temporarily storing said extracted first pre-determined portion; and
 releasing said first temporarily stored portion when said extracting step is operated to extract a second pre-determined portion,
 wherein said extracting step is operated in a cyclical fashion to obtain from said extracted first and second pre-determined portions a desired quantity of the dry food.

* * * * *